Nov. 23, 1926.                                                              1,608,174
H. HEYMANN
DYNAMIC TESTING MEANS FOR BUILDING MATERIAL
Filed Sept. 1, 1922
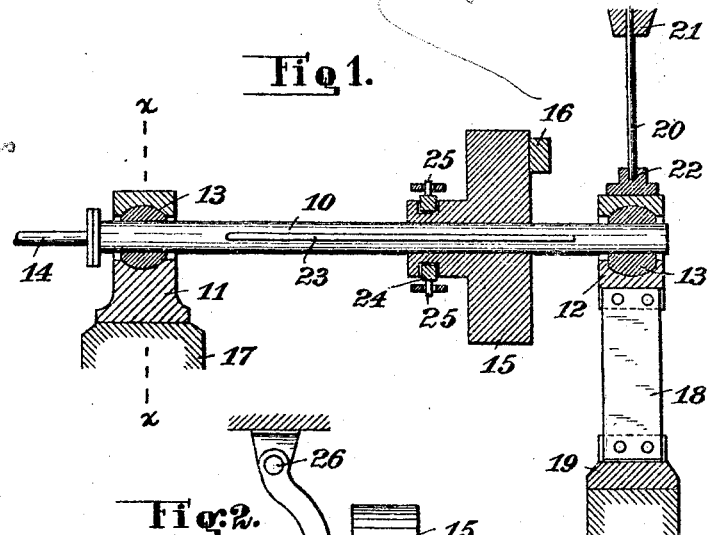
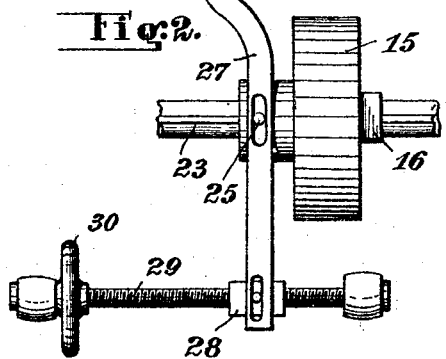
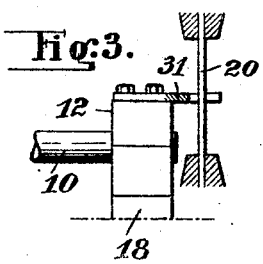
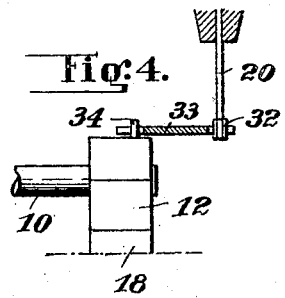
Inventor
Hans Heymann
by *[signature]*
Attorney.

Patented Nov. 23, 1926.

1,608,174

UNITED STATES PATENT OFFICE.

HANS HEYMANN, OF DARMSTADT, GERMANY.

DYNAMIC TESTING MEANS FOR BUILDING MATERIAL.

Application filed September 1, 1922, Serial No. 585,714, and in Germany September 5, 1921.

This invention has reference to the testing of building material and the like of a dynamic method, and in particular by measuring the amount and magnitude of the oscillatory phenomena resulting from the action of a load upon the body under treatment. The testing of building material is at present effected almost exclusively by the static loading of the same. Very frequently, however, the requirements of general machine building call for a knowledge of the behavior of the different kinds of material, when exposed to periodical stresses. Heretofore it has generally been thought sufficient to effect the testing in pendulum beating machines or so-called "tiring" or relaxing machines both of which, however, are imperfect as regards the testing procedure, inasmuch as both kinds of devices are based upon exposing the material to one or several blow-like impulses, the timing of the blows being selected arbitrarily and being unchangeable. This kind of sudden, jerkingly loading of the material, however, very frequently fails to allow of drawing the correct conclusion as to the behavior of the material to be tested when used in practical operation, inasmuch as in the latter case the loads are almost always not produced by blows, but by continuously changing forces acting upon the material.

If a dynamic testing machine for material of various kinds is required to imitate as closely as possible the conditions of strains and stresses actually occurring in practical operation of the material, it should come up to the following requirements:

1. The magnitude of the load should vary periodically, that is to say, it should rise and fall, for example, in accordance with a function of a circle (P. cos);
2. The load should admit of any desired variation of its magnitude;
3. The periodical load (P. cos) should take place with a certain timing ratio which is preferably made to correspond in a certain manner to each particular testing body;
4. The number of times of impulses of the periodical force should admit of being varied at the discretion of the operator.

These four requirements may be satisfied and a testing of the material in accordance with the actual strains of practical operation may be effected in accordance with this invention by causing the actions of the force operating upon the testing body to vary in resounding conformity, in resonance with the testing body operating as a spring or as a resiliently or spring-like acting pendulum; and it is immaterial in this connection, in what manner the resounding loading of the body to be tested is produced.

The novel dynamic testing machine according to my invention may be constructed in the most simple manner in cases where the loading of the testing body is effected by means of a circulating weighing mass the centrifugal forces of which are transmitted in any suitable manner as a load upon the body to be tested. In effecting the test in accordance therewith it is preferable to only transmit the component operating in one plane only of the centrifugal force set up by the rotating weighing mass upon the material to be tested as a testing load. The term weighing mass or "momentum member" as used in this specification means a body adapted to influence the testing body by the vehemence of the momentum produced by the weight of the circulating mass.

The invention is capable of a great variety of different forms of embodiments. Merely for the sake of illustration, and not as a limitation I have shown by way of example one of such embodiments of the principles of my invention on the accompanying drawing.

Fig. 1 shows diagrammatically a device of the kind referred to as seen from the side, and in sectional view;

Fig. 2 is a detail of the device in plan view; and

Figs. 3 and 4 are illustrations showing the changes undergone by the device in making various kinds of tests therewith.

In the device, as shown in Fig. 1, a shaft 10 is rotatably mounted in the two journal bearings 11 and 12 which are arranged and shaped in such a manner as to admit of adjustment of the shaft 10 in relation to the two bearing supports 11 and 12, by a spherical formation of the interior bearing walls 13 for instance. The actuation of the shaft 10 may be effected in any suitable manner, thus for example by means of an electric motor, a flexible shaft 14 being used for instance as a coupling means.

Upon the shaft 10 a carefully poised centrifugally acting weighing mass is mounted, a disc 15 for instance, which may be provided with a load 16 constituted, for instance, by additional weighting means. This loading mass 16 can be arranged, so as to be exchangeable at will, and it may be mounted upon the disc 15 in such a manner that it admits of being radially or otherwise displaced, and preferably during operation which may be effected automatically, and in such a manner as to produce a variation of its centrifugal force.

The shaft 10 in the construction shown by way of example is oscillatingly mounted. With this end in view the support 11 is stationarily mounted upon a bracket 17 while the bearing support 12 is carried by a spring, a flat spring 18 for instance, the lower part of which is securely clamped at 19. The shaft 10 is thus enabled to perform plane pendular oscillations about the axis $x$—$x$ of the support 11, the said oscillations taking place in a plane at right angle to the sectional plane shown in the drawing.

The body to be tested, for example, a testing rod 20 to be investigated in regard to its flexion, is tightly clamped at its upper end 21, that is to say at one side, while its lower end is retained in position by a clamping head 22 which is connected to the oscillatory bearing 12 of the shaft 10. Similar to the present practice in the testing of materials, it is recommendable also in connection with the novel method of testing to employ so-called standard rods. However, while with the standard rods as now employed only the sizes are standardized, it is necessary with the new testing rods to consider in the first place their individual numbers of oscillation, and in different ways in accordance with the manner of effecting the loading, that is to say, for instance in connection with flexional oscillations or with torsional oscillations.

After the starting of the device the small periodical impulses produced by the weighing mass or momentum member 16 prevent the oscillation of the oscillatory bearing 12 of the pendularly supported shaft 10 by the connection with the testing rod 20, while the timing ratio of oscillation of the weighing mass 16 is still below the individual oscillation number of the testing rod 20. Only when, with the same periodical loading the timing ratio of oscillations of the pendular system containing the weighing mass 16 is in accord with the number of individual oscillations of the testing rod 20, the oscillatory bearing 12 will be operated, so as to perform periodical oscillations at right angle to the sectional plane shown in the drawing.

This change of timing ratio of oscillations of the pendular system comprising the shaft 10 and the disc 15 may be effected, for instance, by longitudinal displacement of the disc 15 relatively to the shaft 10 or by a variation of the length of the clamped piece of the spring 18, or even by a change of the distance of the two bearings 11 and 12 from each other. A simple means of effecting the longitudinal displacement of the disc 15 during the operation is shown for instance, in plan view in Fig. 2 of the drawing. The shaft 10, as shown in this figure, carries an elongated key 23 along which the disc 15 is axially movable. A ring 24 engaging with a corresponding groove of the disc 15 is provided with bolts or studs 25, entering a slot provided in a fork 27 which is rotatably mounted at 26. This fork 27 may be moved by means of a slide 28 adapted to be displaced along a screw spindle 29 by means of a hand wheel 30.

After the oscillatable undulatory system by a suitable adjustment has been tuned to resonance with the number of individual oscillations of the testing rod, and upon then altering the magnitude of the centrifugal force produced by the weighing mass 16 referred to in the manner set forth in the first part of the specification, the testing rod may be submitted to a periodical load of any suitable value which may even be gradually increased up to the breaking of the rod.

The device as described comes up to all four conditions hereinbefore enumerated for the operation of a dynamic testing machine for different material. Furthermore, the device presents the advantage of being able to adjust the required periodical loading and the desired number or the timing of the impulses only gradually, inasmuch as the operator is at liberty to cause the weighing mass or the momentum member 16 to operate successively in dissonance, resonance and then again in dissonance.

By operating in this manner it becomes possible to ascertain not only the fractional strain on the testing rod, but also the strain at which the limit of proportionality is reached. For this purpose one may, for instance, proceed as follows:

The timing of the impulses of the dynamic testing machine is tuned in conformity with the individual number of oscillations of the rod, and then the value of the periodical force acting upon the testing rod is increased step by step by varying the centrifugal force. This pendulary force is allowed to act upon the rod for a certain time; then the pendular undulatory system is stopped or it is changed so as to be in dissonance with the testing rod, and care is taken to make sure, if the rod is spring actingly returned into its zero position. This procedure is repeated with a periodical force of a somewhat larger amplitude and so on, until a load is reached at which the testing rod fails to return to its zero position. In this case the limit of proportionality is reached. In a similar manner by a microscopic investigation of the rod conclusions as to the stretching limit may be drawn from certain characteristics observed.

In a similar manner a testing rod may be investigated which is clamped at both ends (Fig. 3). It then becomes only necessary to replace the clamping head 22 according to Fig. 1 by a bifurcated head 31 the slot of which embraces the middle portion of the testing rod 20.

In Fig. 4 is shown a means by which it is possible to test a measuring rod clamped at one end in regard to dynamic torsional and flexional strains. In this case the lower end 32 of the testing rod 20 is rigidly connected, for example to a lever 33 the slotted end of which engages over a pin 34 secured to the support 12.

If a rod is to be tested for periodical compression strains, it is merely necessary to place the testing rod in the plane of oscillation, so that the oscillating pendulum at its timing ratio produces compressing forces upon the rod in its longitudinal direction. In this case a kind of pendulum beating mechanism is obtained, with the difference however, that the extent of the blow and the timing of the same is variable and adjustable at will and with great precision.

The invention is by no means restricted to the manner of operation and the form of execution hereinbefore specifically described, but it admits of modifications of any suitable kind.

I wish it to be understood that I do not desire to be limited to the exact details of construction shown and described, for obvious modifications will occur to a person skilled in the art.

I claim:

1. The method of testing building and similar material, comprising fixing one point of the test body so as to permit elastic pendular oscillations of said body relatively to said point, and causing a dynamic force to act upon said body in resonance with the oscillations of said body.

2. The method of testing building and other material, comprising fixing one point of the test body so as to permit elastic pendular oscillations of said body relatively to said point, and causing a dynamic force to operate on said body at a ratio increasing and decreasing in accordance with circular algebraic functions.

3. The method of testing building and other material, comprising fixing one point of the test body so as to permit elastic pendular oscillations of said body relatively to said point, and causing at least a part of the centrifugal forces of a rotating mass to be transmitted on said body.

4. The method of testing building and other material, comprising fixing one point of the test body so as to permit elastic pendular oscillations of said body relatively to said point, and transmitting the axially directed component of the centrifugal force of rotating masses to be transmitted upon said body.

5. The method of testing building and other material, comprising fixing one point of the test body so as to permit elastic pendular oscillations of said body relatively to said point, adjustably and rotatably mounting vehemently projected masses relatively to said body, and causing at least part of the centrifugal force set up by the rotation of said masses to operate upon said body.

6. The method of testing building and other material, comprising fixing one point of the test body so as to permit elastic pendular oscillations of said body relatively to said point, adjustably and rotatably mounting vehemently impelled masses in operative relation to said body, and causing at least part of the centrifugal forces set up by the rotation of such masses to operate upon said body in resonance with the individual oscillations thereof.

7. Device for the dynamic testing of building and other material, and comprising means for fixing one point of the test body so as to permit elastic pendular oscillations of said body relatively to said point, rotatable, vehemently circularly projected means, and means adapted to transmit the force of such rotatable projection upon the testing material.

8. Device for testing building and other material, and comprising means for fixing one point of the test body so as to permit elastic pendular oscillations of said body relatively to said point, a dynamically operating projected member adjustably mounted relatively to the testing material, and operating means intermediate said material and said member and adapted to transmit a suitable amount of the dynamic force of said member unto said material.

9. Device for testing building and other material, comprising a body to be tested, means adapted to fix one point of the test body so as to permit elastic pendular oscillations of said body relatively to said point, a dynamically operating projected member adjustably mounted relatively to said material and operating means intermediate said body and said member adapted to transmit at least part of the dynamic force of said member unto said material.

10. Device for testing building and other material, comprising means adapted to fix one point of the test body so as to permit elastic pendular oscillations of said body relatively to said point, a dynamically operating, substantially pendularly and rotatably projected member adjustably mounted with relation to said material and means intermediate said member and said body and adapted to transmit a suitable amount of the dynamic force of said member unto said material.

11. Device for testing building and other material, and comprising means for fixing one point of the test body so as to permit elastic pendular oscillations of said body relatively to said point, substantially centrifugally projected masses of alterable size and force, and means operatively related to said masses and to the testing material, whereby the value of the amplitude of the dynamic force operating upon the testing material may be varied.

12. Device for testing building and other material, comprising means for fixing one point of the test body so as to permit elastic pendular oscillations of said body relatively to said point, an oscillatingly mounted rotating shaft, operating means for said shaft, a substantially centrifugally projected weighted member on said shaft, means operatively related to said member and to the testing material, and adapted to transmit the dynamic force of said member unto said material, and means to vary the distance of said member from said shaft, so as to be able to vary the amplitude of oscillations of the transmitted force.

13. Device for testing building and other material, comprising means for fixing one point of the test body so as to permit elastic pendular oscillations of said body relatively to said point, an oscillatingly mounted rotating shaft, operating means for said shaft, a substantially centrifugally projected weighted member, connected to said shaft, means for varying the radial distance of said member from said shaft, and means operatively connecting said shaft to the testing material.

14. Device for testing building and other material, comprising means for fixing one point of the test body so as to permit elastic pendular oscillations of said body relatively to said point, a rotatable shaft operatively connected with the test body, substantially centrifugally projected weighted masses on said shaft, and means for axially displacing the masses along said shaft, so as to vary the frequency of the periods of the oscillations of the masses.

15. Device for testing building and other material, comprising means for fixing one point of the test body so as to permit elastic pendular oscillations of said body relatively to said point, a rotatable shaft, a substantially centrifugally projected dynamic member, and a supplemental spring member coacting with the testing material and said dynamic member, and operatively related to said dynamic member and to said material.

16. Device for testing building and other material comprising a pendularly mounted operating shaft, a weighted centrifugally impelled member on said shaft, a bearing for said shaft, said bearing being arranged for free motion about a centre point, an additional bearing of like properties for said shaft, said last mentioned supporting bearing being operatively related to the testing material.

17. Device for testing building and other material, comprising a pendularly mounted operating shaft, a weighted centrifugally impelled member on said shaft, said bearing being arranged for free motion about a centre point, an additional bearing of like properties for said shaft and a supplemental spring member coacting with said shaft, said last mentioned supporting bearing being in operative relation to the testing material and to said shaft.

18. Device for testing building and other material, comprising a pendularly mounted operating shaft, a weighted centrifugally impelled loading member on said shaft and interchangeable bearings for said shaft adjustably spaced from each other, said bearings being arranged for free motion about a centre point, said shaft being operatively related to the testing material.

In testimony whereof I affix my signature.

HANS HEYMANN.